MULTIPLEX TRANSMISSION SYSTEMS

Filed Aug. 11, 1959 5 Sheets-Sheet 1

INVENTORS

GEORGE HELIER FOOT
JOHN EDWARD FLOOD

BY Larson and Taylor

INVENTORS

GEORGE HELIER FOOT
JOHN EDWARD FLOOD

BY Lawson and Taylor

INVENTORS
GEORGE HELIER FOOT
JOHN EDWARD FLOOD

BY Larson and Taylor

INVENTORS
GEORGE HELIER FOOT
JOHN EDWARD FLOOD

BY Larson and Taylor

April 2, 1963 G. H. FOOT ET AL 3,084,222

MULTIPLEX TRANSMISSION SYSTEMS

Filed Aug. 11, 1959 5 Sheets-Sheet 5

INVENTORS

GEORGE HELIER FOOT
JOHN EDWARD FLOOD

BY Lawson and Taylor

United States Patent Office 3,084,222

Patented Apr. 2, 1963

3,084,222

MULTIPLEX TRANSMISSION SYSTEMS

George Helier Foot, Esher, and John Edward Flood, Herne Hill, London, England, assignors to Associated Electrical Industries (Woolrich) Limited, a limited company of Great Britain Filed Aug. 11, 1959, Ser. No. 833,020
Claims priority, application Great Britain Aug. 11, 1958
2 Claims. (Cl. 179—15)

This invention relates to multiplex transmission systems in which a number of independent signals are transmitted over a single transmission path.

The invention has an important application inter alia in multiplex telephone systems for transmitting speech signals but is also applicable to systems transmitting information other than telephone signals such as video signals and data signals. It is applicable to transmission over lines including concentric lines and waveguides and also to transmisison over radio links.

In multiplex systems as employed hitherto it has been common practice to transmit the signals in frequency division multiplex in which a separate carrier wave having a different frequency is provided for the transmission of each signal. Such a system requires a large number of carrier frequency generators and a corresponding number of tuned receivers.

An alternative method also in use is to employ time division multiplex in which the medium of transmission is connected to each of the signals in rapid recurrent succession by switching. With such arrangements, however, there is a limit to the number of channels since the sampled signals must be sufficiently time spaced to avoid cross talk.

A main object of the invention is to provide an improved time division multiplex system which increases the number of channels which may be transmitted in a given frequency bandwidth as compared with known systems of this type.

According to the present invention a multiplex transmission system includes storage tubes at the transmitter and receiver whereby the signals of a number of channels can be written into the transmitter tube and then read out in a recurring sequence for transmission to the receiver where they are written into the receiver storage tube and then distributed by the receivers into the associated respective channels and in which sample signals from the different channels are fed to the storage device in a recurring sequence so that the signals are stored in the tubes in a rectangular matrix, writing being in columns (or rows) and the time spacing being substantially uniform so that signals of the respective channels appear in rows (or columns) and are then read in rows (or columns) so that bursts of signals from each channel are transmitted in turn.

It will be appreciated that by writing in columns and reading in rows (or vice versa) a short train of each signal is transmitted in sequence instead of a single impulse, economy in time is obtained since in order to avoid cross talk between the channels it is only necessary to leave time spacing between successive trains of signals instead of to provide time spacing between each individual sample impulse as in the more customary arrangements.

Preferably there is a pair of storage devices at the transmitter and another pair at the receiver and switching means whereby when one tube of each pair is reading the other is writing and the operations are then interchanged.

According to a further feature of the invention means are provided whereby if no signals appear for an individual channel the scan jumps to the next channel in the sequence.

Means may be provided for synchronising the switching at the receiver with the transmitter switching and this may be effected by transmitting appropriate synchronising pulses. Such synchronising pulses may be pulses of larger amplitude or opposite polarity after each set (say twelve) of signal samples. These pulses can be separated at the receiving station and used to drive a distributor. A longer pulse or coded group of pulses can be sent after each complete cycle, e.g. frame.

The storage of each signal is continued for a substantial time which may be as long as desired with the limitation in practice that the delay introduced thereby must not cause annoyance to the person receiving the signal. As an example in the case of person to person telephone conversations the delay could be of a few milliseconds in duration.

As a result of this process the individual carrier frequencies and frequency filters required with frequency multiplex systems are rendered unnecessary. At the same time the frequency bandwidth required is less than that which would be required with a conventional time division multiplex system.

In order that the invention may be more clearly understood reference will now be made to the accompanying drawings, in which:

FIG. 1 shows diagrammatically the arrangement of the store matrix.

FIG. 2 similarly shows the arrangement at the receiver.

Figure 5:
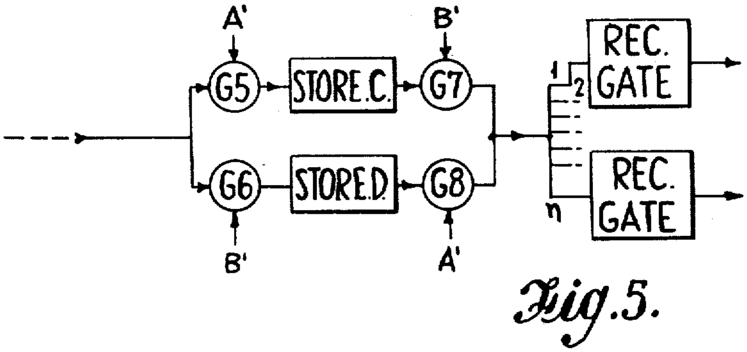

FIG. 5 similarly shows the store switching arrangement at the receiver.

Figure 6:
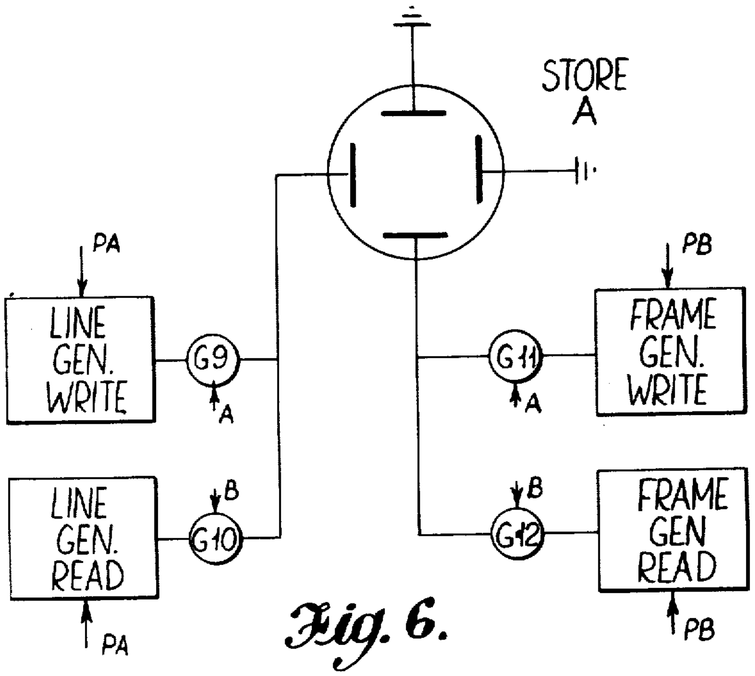

FIG. 6 shows in block form the arrangement for switching the scan generators for one of the stores.

Figure 7:
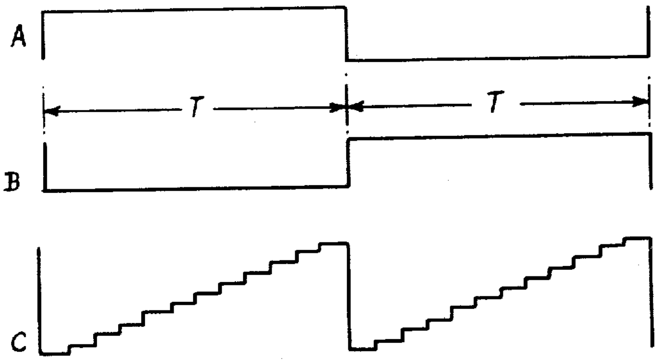

FIG. 7 shows the waveform of the switching and scan voltages.

Figure 8:
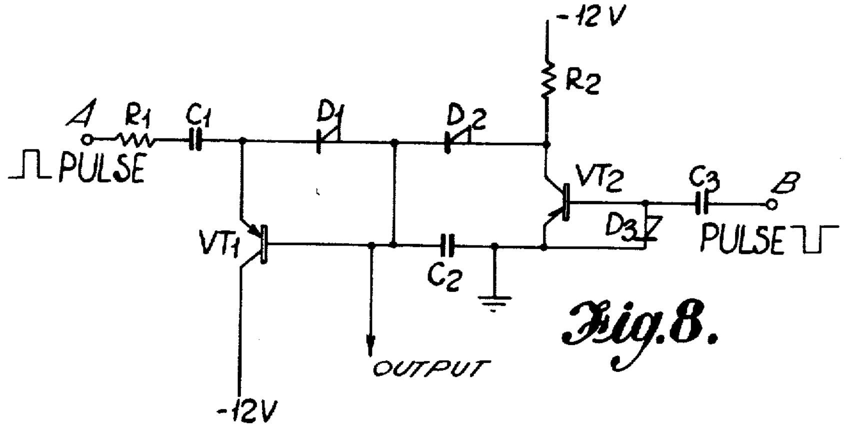

FIG. 8 shows an example of a staircase frame scan generator.

Figures 9, 10:
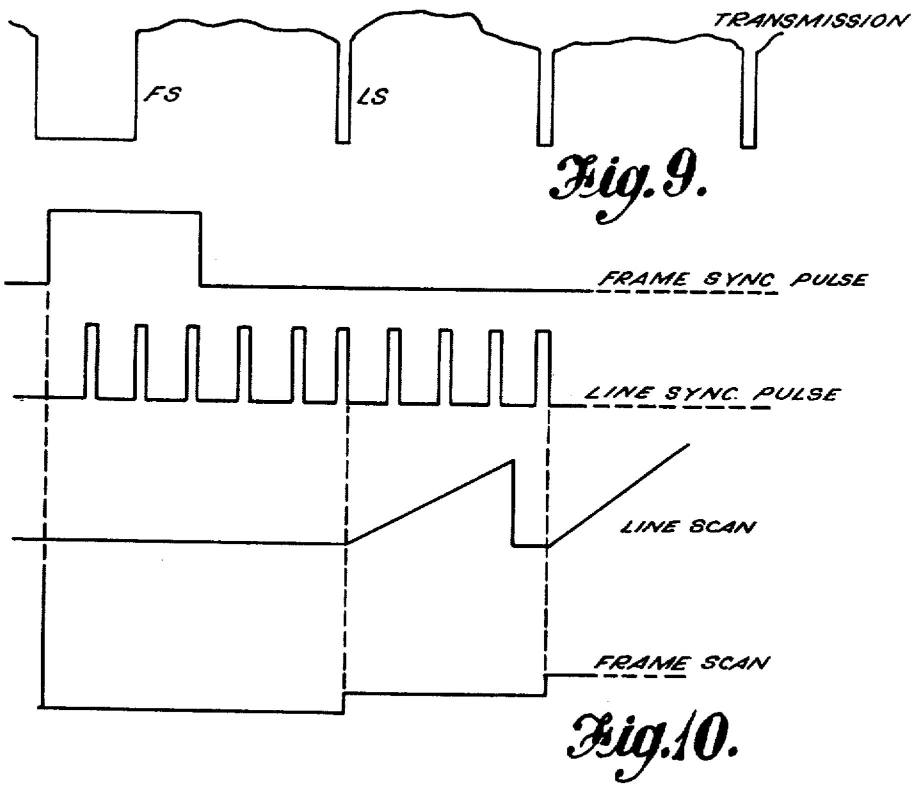

FIG. 9 shows a waveform for a transmission signal with sync pulses.

FIG. 10 shows the sync pulses and scan voltage waveforms at the receiver.

Figure 11:
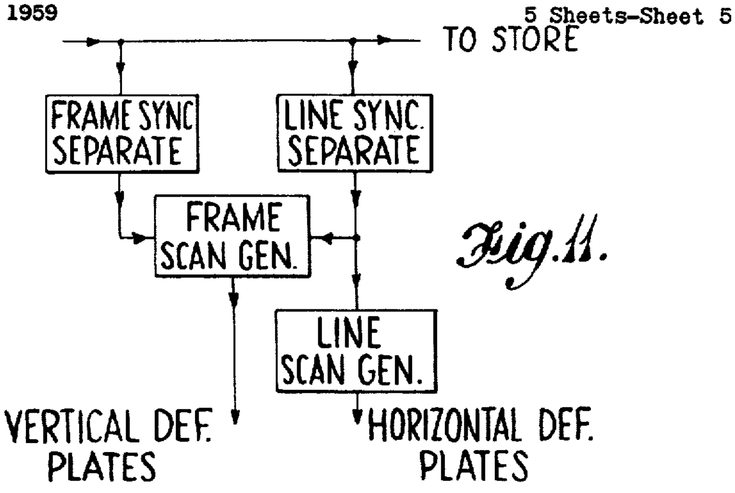

FIG. 11 shows a sync separation arrangement for the receiver.

Figure 12:
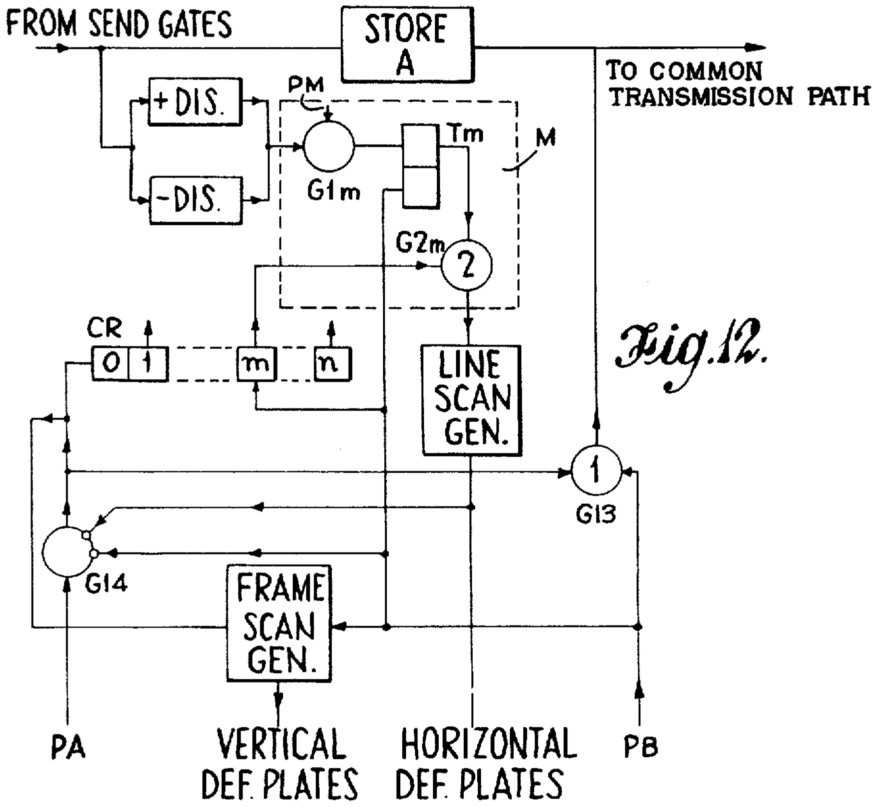

FIG. 12 shows an arrangement for time assignment speech interpolation, and

Figure 13:
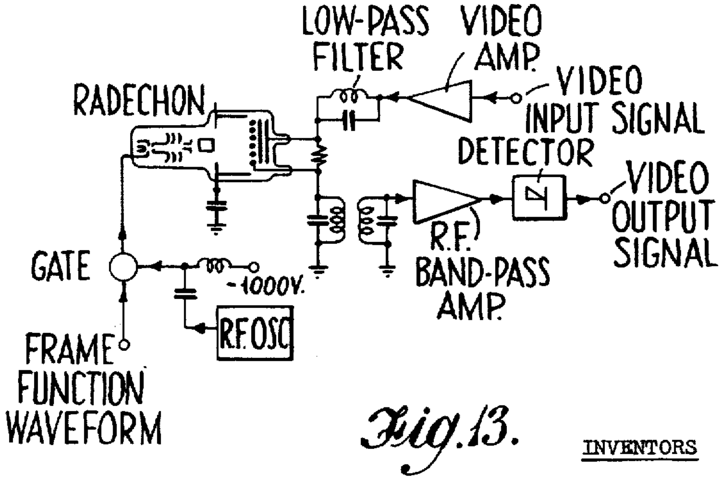

FIG. 13 shows a Radechon Store using radio-frequency signal separation.

In the following description it will, for convenience, be assumed that at the transmitter writing will be carried out in columns and reading in rows and at the receiver writing effected in rows and reading in columns. It will be understood, however, that converse arrangements could equally well be employed.

Figures 1, 2:
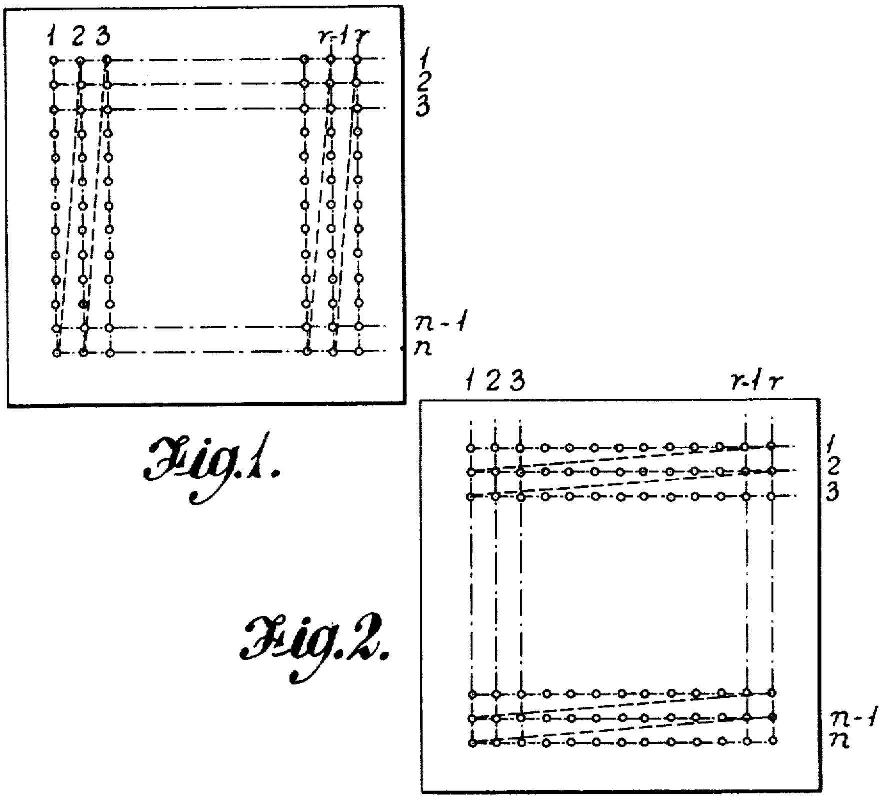

FIG. 1 shows the arrangement of a raster at the transmitter in which, as above mentioned, it is assumed that writing is carried out in vertical sweeps down each of the columns in turn from left to right. During writing sample signals from each of the sources are written in turn into the store, the writing being sequentially downwards and the displacement between samples being uniform so that in each row of the raster all the signals will be associated with the same channel.

The writing occupies a full frame and a writing frame is followed by a reading frame in which the storage tube is scanned horizontally as shown in FIG. 2. Since each row contains signals of the same channel the result will be that a short train of signals from each of the channels in turn will be transmitted and by carrying out the reading at a high speed it is possible to effect time compression of the signals so that in this way it is possible to transmit a large number of channels concurrently. Correspondingly at the receiver writing of the received trains of signals is effected at high speed horizontally according to the raster shown in FIG. 2 and reading is then carried out vertically and the signals are distributed to the appropriate receivers in the form of recurrent impulses.

Figure 3:
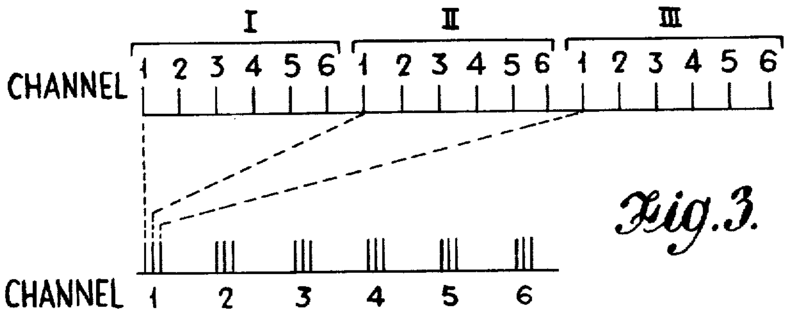
FIG. 3 is an explanatory figure explaining the operation of FIG. 1.

FIG. 3 is an explanatory figure which illustrates the compression result obtained by the invention, the upper part of the figure shows the effect of transmitting sample signals of six channels in the form of recurrent impulses. In the figure there are shown three successive impulses of each channel. In the upper part of the figure the groups are indicated by the references I, II, III. Since each sample is adjacent to a sample from a different channel it is necessary to provide adequate time spacing between successive impulses in order to avoid cross talk. If, however, the sample impulses are arranged in successive trains of signals, as shown in the lower part of the figure, it is only necessary to provide time spacing between adjacent signal trains and hence an appreciable economy in time space can be obtained as the signal trains may be time compressed provided they are adequately separated from adjacent signal trains of other channels.

Figure 4:
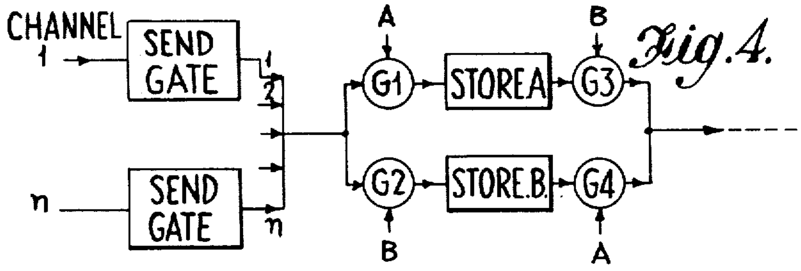
FIG. 4 shows in block form the store switching arrangement at the transmitter.

FIG. 4 illustrates in block form the store switching arrangement at the transmitter. A number of input channels are fed through associated send gates on the left of the figure the send gates being operated sequentially so that each channel in turn is connected to the stores. Store A and store B read and write alternately during successive frames and are controlled by the gates G1, G2, G3 and G4. Control signals A and B are applied alternately to the gates so that opening of gates G1 and G4 alternates with G2 and G3. When G1 and G4 are open during one frame the incoming signals are fed through gate G1 and are written into store A. At the same time the signals in store B are read and fed through the gate G4 to the transmission path. At the end of the frame signal A is removed and signal B applied. Gates G3 and G2 will now be opened and G1 and G4 blocked. Thus, the information which was previously written into store A will be read out and transmitted and at the same time the next cycle of information will read into store B.

FIG. 5 shows a corresponding arrangement at the receiver which operates in a similar manner. The incoming signals are fed alternately into store C and store D, whilst information is being written into store C and information is being read out from store D and passed through the appropriate receivers associated with the respective channels. The control is obtained by means of signals A′ and B′ which control the gates G5, G6, G7 and G8. The signals A′ and B′ are approximately synchronised with signals A and B at the transmitter and it follows that with the arrangement shown each transmitter store will always transmit signals to the same receiver store.

It will be understood that unless the raster is square it will be necessary to have different line and frame scan speeds during reading to the speeds used during writing.

In FIG. 6, which shows in block form how this may be arranged, there are separate line generators for reading and writing and similarly separate frame generators for reading and writing. During writing signal A (or A′) will be applied to gates G9 and G11 so that the line write and frame write generators will be connected to store A shown in FIG. 4, and similarly, during reading the read line and frame generators will be connected to the deflection plates of store A through gates G10 and G12 which are opened by signal B.

Synchronisation is maintained by line sync pulses PA applied to the line generators and frame sync pulses PB applied to the frame generators.

FIG. 7 shows the waveform of the control signals A and B which are rectangular with a duration T which is equal to the duration of one frame scan. The line scan generator will generate a normal sawtooth voltage and any well known generator may be employed. The frame scan generator preferably generates a stepped voltage, as shown by waveform C in FIG. 7, the length of each step being sufficient to permit a line scan to be carried out.

FIG. 8 shows a suitable transistor circuit for generating the waveform C shown in FIG. 7.

The operation of this circuit is as follows.

A positive-going pulse applied to terminal A charges the capacitor C1 via transistor VT1, whose emitter-base junction is forward-biased by the pulse. Diode D1 is reverse-biased and non-conducting. At the end of the pulse, the voltage at A drops and the voltage at the emitter of VT1 and the cathode of D1 goes negative by the same amount. D1 now conducts and VT1 is cut off. The capacitor C1, which previously charged via VT1, then discharges via D1 and capacitor C2 to earth; the charge on C1 is then transferred to C2. When C1 is discharged, D1 ceases to conduct. However, VT1 remains cut-off so that C2 stores its accumulated charge. On the arrival of another pulse at terminal A the operation is repeated, C1 being first charged and then transferring its charge to C2. Thus, as each pulse arrives at terminal A, the charge stored on C2 and the voltage across it are increased in steps which are very nearly equal. This stepped voltage appears at the output terminal.

After a certain number of pulses at terminal A, a negative-going pulse at terminal B switches on transistor VT2. The collector voltage of VT2 rises to earth and diode D2 conducts, thus discharging C2 and causing the output voltage to rise to earth. The cycle is then continuously repeated.

The cathode ray tube store is required to store a half tone pattern and reproduce it with the degree of linearity required for speech or other transmission employed. A tube that appears to meet this requirement is the Radechon described in the R.C.A. Review, volume 16, June 1955, at page 197.

This tube has a barrier grid immediately in front of the target that prevents redistribution of charge over the target such as occurs in many other storage tubes. Signals may be written into the tube either by (*a*) applying them to the electron-gun control grid while the plate is held at constant potential, or (*b*) applying them to the plate while the control-grid potential is held constant.

The latter method has the important advantage that erasure of old information is accomplished automatically by the writing of new information; it is, therefore, preferred for use in time compression multiplex stores.

The signal can be read from the tube by means of a load resistance connected either in the screen or plate circuit. It is important to separate the required output signals from the input signals and from transients caused by switching the tube from the writing to the reading condition. This can best be done by writing in with D.C. impulses and reading out in A.C. signals the beam having a superimposed R.F. modulation.

FIG. 13 shows a suitable circuit for carrying this out and for a description of this circuit reference may be made to the R.C.A. Review article for June 1955 at page 238.

In order to obtain correct operation of the system it is necessary to synchronise the waveform generators at the receiving station with those at the transmitter. This can be done by incorporating line and frame synchronising pulses LS and FS in the waveform sent over the common transmission path, as is done in television. A suitable composite waveform is shown in FIG. 9. The line sync pulses can be pulses of larger amplitude or opposite polarity sent after each group of signal samples.

FIG. 10 shows the sync pulses at the receiver and FIG. 11 shows a suitable sync separator arrangement. At the receiver the pulses are used to trigger the line scan generator and a distributor to generate the channel pulse trains. A longer pulse can then be sent after each complete frame to trigger the frame scan generator for its next sweep. The frame sync pulse can be separated from the line sync pulses by means of an integrating or a differentiating circuit. Alternatively, the frame sync signal can be a coded group of pulses that is detected by a delay line circuit.

The number of speech channels that can be sent over a transmission path of given bandwidth can be increased by the process known as "Time assignment speech interpolation" (T.A.S.I.). This process exploits the fact that, on average, each channel in a multiplex telephone system is transmitting speech for less than half the time. By allocating a transmission channel to a speech input channel only when the latter has a signal present, it is possible to transmit nearly $2n$ independent speech channels over an $n$-channel multiplex transmission system.

At the sending end, the signal samples are monitored during the writing process to detect if signals are present. If all the samples received from a channel are of zero amplitude, the horizontal line on which these samples are stored is omitted during the reading scan. Consequently, the time taken to send the signals out is less than it would be if all lines were scanned. The number of channels whose signals can be sent in each frame can, therefore, be nearly doubled. At the receiving end, the corresponding line in the store must also be omitted during the writing frame. During the reading frame all lines are scanned in the normal way and the correct output signal is produced for each channel.

At the sending end, it is necessary to store an additional bit of information for each channel, namely, whether all its samples are zero during a frame or whether at least one sample is not zero. This information determines whether or not the corresponding line in the store is scanned during reading. The same information must also be transmitted to the receiving terminal, where it determines whether the corresponding line in the store is scanned during writing. A suitable arrangement for achieving this is shown in FIG. 12.

Connected to the common lead from the send gates to the store are (+) and (−) discriminator circuits. A discriminator consisting of the well-known Schmitt trigger circuit can be set to produce an output only when its input signal exceeds some predetermined threshold. This threshhold level should be set so that all but the weakest speech signals exceed it and noise voltages on the input channels rarely exceed it. Since speech signals are alternating, the channel sending gates used are of a type that send both positive- and negative-going pulses, depending on the polarity of the input signals. (Symmetrical transistor gates are suitable for this purpose.) A pair of discriminator circuits are used; one operates when a sample amplitude exceeds a given positive voltage and the other operates when the amplitude exceeds a negative voltage of the same magnitude.

The apparatus shown within the dashed square is individual to channel $m$ and repeated for each channel. The remaining apparatus is common to all channels.

A trigger circuit T$m$ associated with each channel is connected to the outputs of the two discriminators by a gate G1$m$ that is opened by the corresponding channel pulse $pm$ if any pulse produced by a channel sending gate during the writing frame of the store exceeds the threshold level of either discriminator.

After completion of the writing frame, the store commences its reading frame, which is controlled by the waveforms shown in FIG. 10. The synchronising pulses are also sent to the common transmission path through fate G13. Each of the line sync pulses PA causes the counter CR to step one position and produce a voltage on its corresponding output lead. Each stage of this counter corresponds to a channel in the system with its output lead connected to the corresponding gate G2$m$. In FIG. 12 stage $m$ is connected to gate G2$m$. If trigger circuit T$m$ is unoperated (due to the absence of channel samples during the writing frame), gate G2$m$ does not operate and the line scan generator is not triggered. However, pulse PA passes to the common transmission path via G13 and is also sent to the frame scan generator. The latter changes its output voltage by one step, causing it to deflect the beam to the next line without effecting a line sweep. Succeeding PA pulses step the counter one position at a time until the counter reaches a position corresponding to a channel that had produced samples during the writing frame.

If, for example, channel $m$ had produced samples during the writing frame then trigger circuit T$m$ would be in the operated condition. Pulse PA then passes through gate G2$m$ and triggers the line scan generator, thus causing the store to read out its stored signal for that channel. Whilst the line scan generator is operating, it inhibits further PA pulses at gate G14. At the conclusion of the line scan, gate G14 opens again and the next PA pulse causes the counter to step to the next position. This process continues until the end of the frame-scan period. The frame sync pulse PB then resets the frame scan generator, the counter CR and the trigger circuits T$m$. The PB pulse is also sent to the common transmission path via G13. During the frame sync pulse, the line sync pulses are again inhibited at gate G14.

The signal sent over the common transmission path consists of PB pulses, PA pulses and the signal read out from the store. During portions of the frame when no signals are present in the store the PA pulses follow in close succession. When a stored signal is encountered, an interval equal to the line scan period occurs between a pair of PA pulses and the signal stored on a line of the store is transmitted during this interval. In this way, the duration of each frame scan can be less than $n$ times the line scan period, thus permitting an increase in the number of channels for a given bandwidth of the common transmission path.

It will be understood that this arrangement provides a time saving but the same storage surface area is required. However, since the frame duration must be fixed, more signals can be transmitted during a frame period.

The gates used can be conventional diode circuits and the counter CR can be a conventional chain circuit using valves or transistors. The trigger circuits T$m$ can be conventional Eccles-Jordan trigger circuits, also using valves or transistors. If the number of channels in the system is small (e.g. 12) the pulse periods used will be fairly long and ferrite-core stores can be used. Each ferrite core can combine the functions of the trigger T$m$ and the gates G1$m$ and G2$m$. If the number of channels in the system is large (e.g. 600) the pulse periods will be very short and it may be preferable to use a common delay-line or cathode-ray tube store to replace the individual trigger circuits T$m$. If a cathode-ray tube store is used, it may be possible to use the tube that stores the speech samples for this purpose also. If the T.A.S.I. bit of information is written at the end of the line containing the speech samples the reading operation can be carried out in the reverse direction to that considered previously. The T.A.S.I. bit is then read from the store before the speech samples and can be used to control the line scan generator.

At the receiving terminal, the frame sync pulses (PB) and the line synch pulses (PA) are received from the common transmission path and separated in the conventional way. These pulses are then used to operate the frame and line scan generators. The line scan generator is a free-running time-base circuit whose fly-back is caused by receipt of a PA pulse. When no signal samples are being transmitted, PA pulses are received in rapid succession. Thus, each time the line scan generator starts to produce a sweep it is rapidly reset again. Each PA pulse also steps the frame scan generator, causing it to deflect the beam to the next line. When signal samples are being transmitted, the interval between PA pulses is the full line scan period and the line scan generator is able to complete its sweep. During this sweep, the transmitted speech samples are written into the store. At the end of the frame, the frame scan generator is reset by the PB pulse. During the ensuing reading frame, the speech samples are read from the store and distributed to the channel receiving gates.

Whilst in the above description two storage tubes have been used at transmitter and receiver alternatively a single tube having two beams could be used.

What we claim is:

1. In a multiplex transmission system having a transmitter and a receiver, a cathode ray storage device having a storage surface at the transmitter, line scanning means and frame scanning means for writing sample signals of a number of channels on to the storage surface in recurrent parallel sweeps to form a rectangular matrix in which sample signals of the respective channel are aligned laterally, reading line scanning means and reading frame scanning means for scanning said storage surface with recurrent lateral sweeps at a speed which is high relative to that of the original signals, switching means for alternately connecting the writing scanning means and reading scanning means to the deflection control of the cathode ray tube, means whereby the reading line scanning means is only triggered if during writing signals corresponding to that channel have been received and means for transmitting the trains of signals thereby obtained sequentially to the receiver and means at the receiver for separating the signals into appropriate channels.

2. In a multiplex transmission system having a transmitter and a receiver, a cathode ray storage device having a storage surface at the transmitter, line scanning means and frame scanning means for writing sample signals of a number of channels on to the storage surface in recurrent parallel sweeps to form a rectangular matrix in which sample signals of the respective channel are aligned laterally, line scanning means and frame scanning means for scanning said storage surface with recurrent lateral sweeps to read the signals at a speed which is high relative to that of the original signals, switching means for alternately connecting the writing scanning means and reading scanning means to the deflection control of the cathode ray tube, means whereby the reading line scanning means is only triggered if during writing signals corresponding to that channel have been received said means including a minimum level discriminator to which incoming signals are applied, a step by step control device and a gate which is opened to pass triggering signals to the reading line scan generator only if signals are received both from the step by step control device and from the discriminator and means for transmitting the trains of signals thereby obtained sequentially to the receiver and means at the receiver for separating the signals into appropriate channels.

References Cited in the file of this patent

UNITED STATES PATENTS

| | | |
|---|---|---|
| 2,263,369 | Skillman | Nov. 18, 1941 |
| 2,275,224 | Henroteau | Mar. 3, 1942 |
| 2,627,553 | Levey et al. | Feb. 3, 1953 |
| 2,640,881 | Veaux | June 2, 1953 |
| 2,656,485 | Page | Oct. 20, 1953 |
| 2,670,405 | Mohr | Feb. 23, 1954 |
| 2,691,727 | Lair | Oct. 12, 1954 |
| 2,839,679 | Harris | June 17, 1958 |
| 2,941,074 | Poole | June 14, 1960 |

UNITED STATES PATENT OFFICE
CERTIFICATE OF CORRECTION

Patent No. 3,084,222 April 2, 1963

George Helier Foot et al.

It is hereby certified that error appears in the above numbered patent requiring correction and that the said Letters Patent should read as corrected below.

In the grant, lines 3 and 13, and in the heading to the printed specification, line 5, for "(Woolrich)" each occurrence, read -- (Woolwich) --.

Signed and sealed this 1st day of October 1963.

(SEAL)
Attest:

ERNEST W. SWIDER

Attesting Officer

DAVID L. LADD

Commissioner of Patents